(12) United States Patent
Brito

(10) Patent No.: US 9,238,407 B1
(45) Date of Patent: Jan. 19, 2016

(54) TIRE PRESSURE DEPENDENT CRUISE CONTROL DEVICE

(71) Applicant: Jose Brito, San Bernardino, CA (US)

(72) Inventor: Jose Brito, San Bernardino, CA (US)

(*) Notice: Subject to any disclaimer, the term of this patent is extended or adjusted under 35 U.S.C. 154(b) by 92 days.

(21) Appl. No.: 14/173,532

(22) Filed: Feb. 5, 2014

(51) Int. Cl.
*B60K 31/00* (2006.01)

(52) U.S. Cl.
CPC .................. *B60K 31/00* (2013.01)

(58) Field of Classification Search
None
See application file for complete search history.

(56) References Cited

U.S. PATENT DOCUMENTS

| | | | |
|---|---|---|---|
| 5,790,016 A * | 8/1998 | Konchin et al. | 340/448 |
| 6,124,787 A * | 9/2000 | Isakov et al. | 340/448 |
| 6,498,967 B1 * | 12/2002 | Hopkins et al. | 701/1 |
| 6,556,915 B2 * | 4/2003 | McCurdy | 701/97 |
| 6,581,449 B1 * | 6/2003 | Brown et al. | 73/146 |
| 7,739,023 B2 | 6/2010 | Lee | |
| 7,769,506 B2 | 8/2010 | Ohtsuji | |
| 8,214,124 B2 | 7/2012 | Kumabe et al. | |
| D670,589 S | 11/2012 | Yamada | |
| 2007/0080794 A1 * | 4/2007 | Thiele | 340/442 |

FOREIGN PATENT DOCUMENTS

EP 1886891 9/2011

* cited by examiner

*Primary Examiner* — Rami Khatib

(57) ABSTRACT

A tire pressure dependent cruise control device automatically disengages cruise control upon detection of unbalanced tire pressures. The device includes a vehicle and a pair of aligned wheels coupled to the vehicle. A cruise control unit is operationally coupled to the vehicle for maintaining a speed of the vehicle independent of a driver constantly depressing a pedal of the vehicle. Each of a pair of sensors is coupled to the vehicle adjacent to an associated one of the wheels. The sensors are aligned and the sensors monitor alignment of the sensors. The sensors are communicatively coupled to the cruise control unit wherein the cruise control unit is deactivated from maintaining a constant speed of the vehicle upon the sensors detecting misalignment of the sensors indicating unbalanced tire pressure in the wheels.

9 Claims, 3 Drawing Sheets

TIRE PRESSURE DEPENDENT CRUISE CONTROL DEVICE

BACKGROUND OF THE DISCLOSURE

Field of the Disclosure

The disclosure relates to cruise control devices and more particularly pertains to a new cruise control device for automatically disengaging cruise control upon detection of unbalanced tire pressures.

SUMMARY OF THE DISCLOSURE

An embodiment of the disclosure meets the needs presented above by generally comprising a vehicle and a pair of aligned wheels coupled to the vehicle. A cruise control unit is operationally coupled to the vehicle for maintaining a speed of the vehicle independent of a driver constantly depressing a pedal of the vehicle. Each of a pair of sensors is coupled to the vehicle adjacent to an associated one of the wheels. The sensors are aligned and the sensors monitor alignment of the sensors. The sensors are communicatively coupled to the cruise control unit wherein the cruise control unit is deactivated from maintaining a constant speed of the vehicle upon the sensors detecting misalignment of the sensors indicating unbalanced tire pressure in the wheels.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
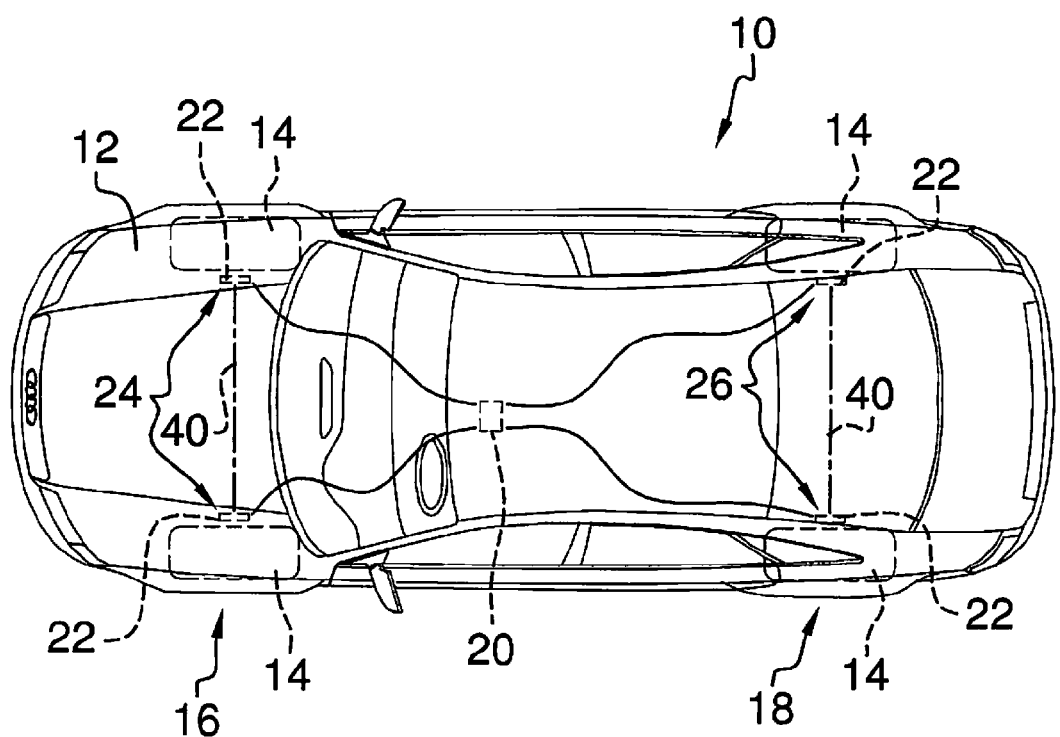
FIG. 1 is a top view of a tire pressure dependent cruise control device according to an embodiment of the disclosure.
Figure 2:
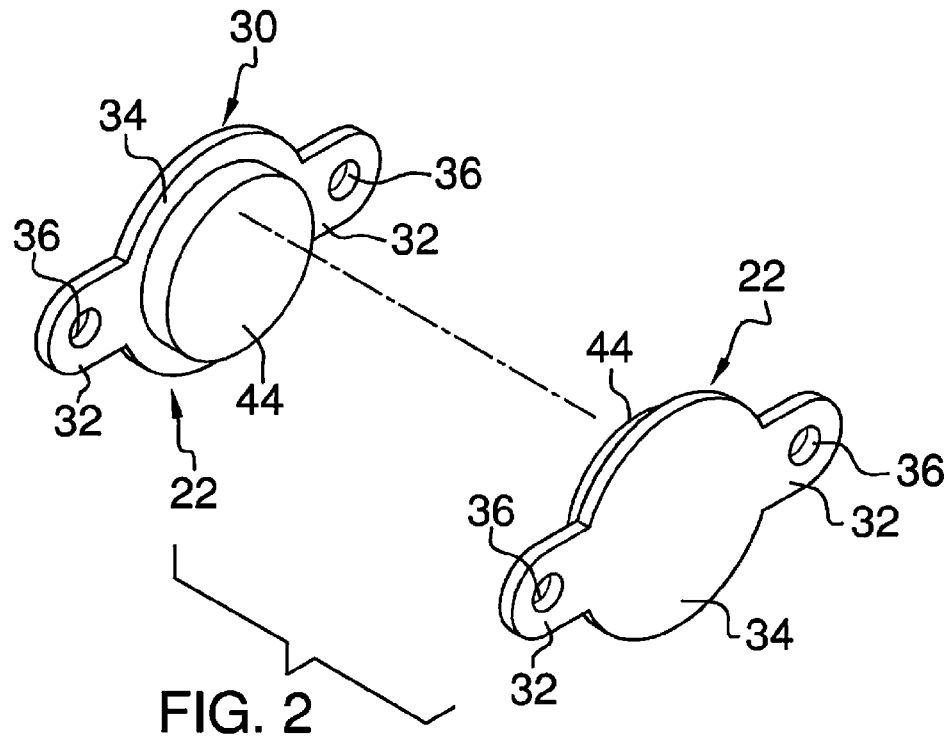
FIG. 2 is a top front side perspective view of an associated pair of sensors of an embodiment of the disclosure.
Figure 3:
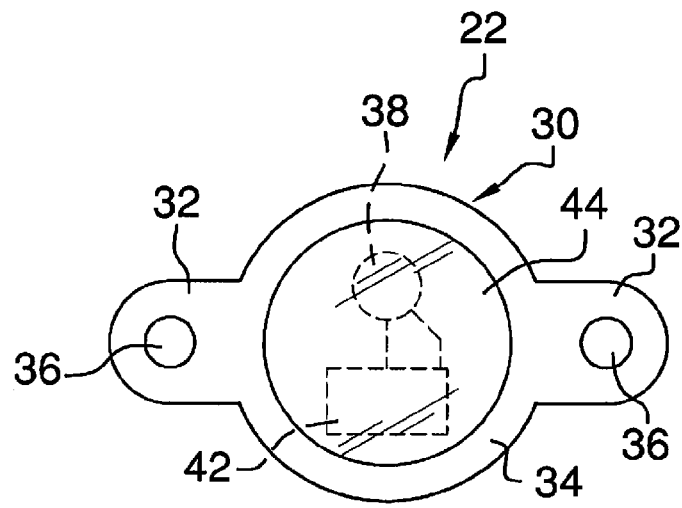
FIG. 3 is a detailed front view of a sensor of an embodiment of the disclosure.
Figure 4:
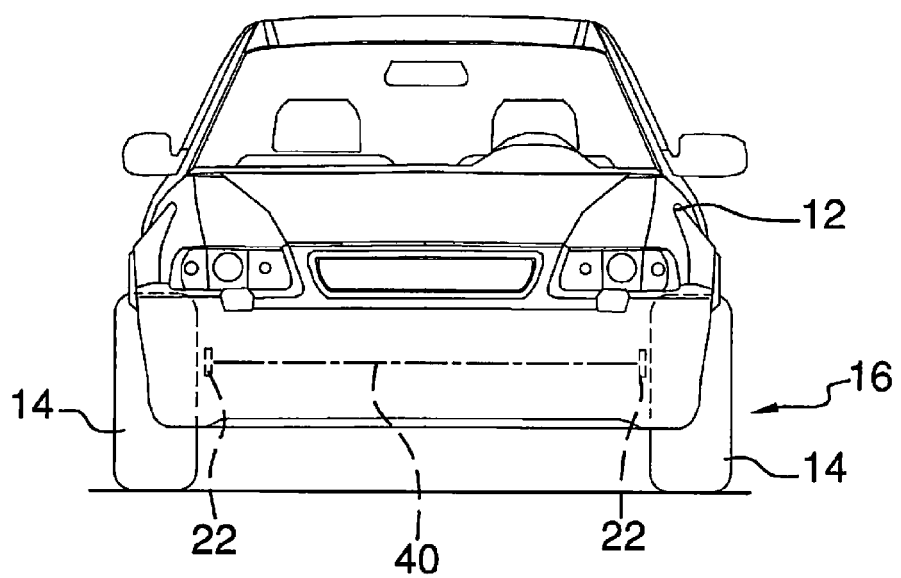
FIG. 4 is a front view of an embodiment of the disclosure in use.
Figure 5:
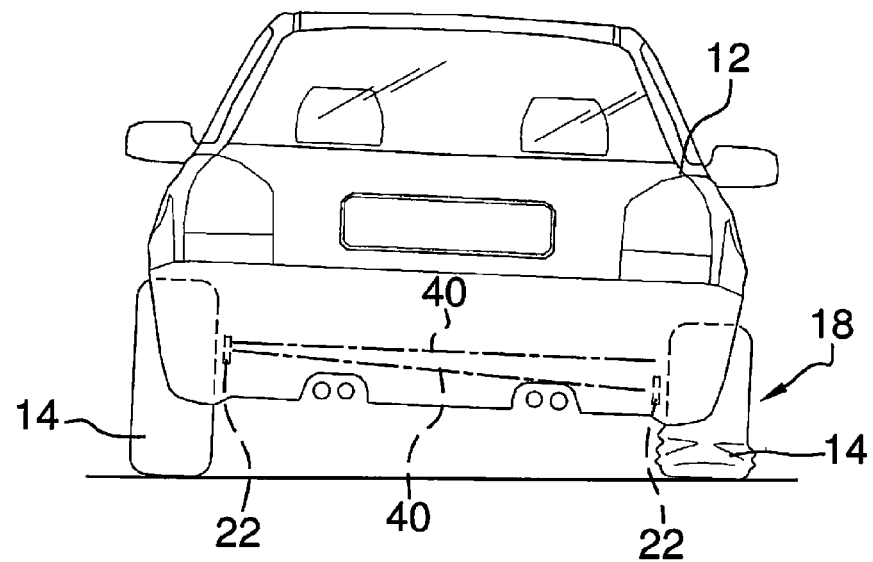
FIG. 5 is a front view of an embodiment of the disclosure in use.

With reference now to the drawings, and in particular to FIGS. 1 through 5 thereof, a new cruise control device embodying the principles and concepts of an embodiment of the disclosure and generally designated by the reference numeral 10 will be described.

As best illustrated in FIGS. 1 through 5, the tire pressure dependent cruise control device 10 generally comprises a vehicle 12 having a plurality of wheels 14 coupled to the vehicle 12. The plurality of wheels 14 comprises a first pair 16 of the wheels 14 and a second pair 18 of the wheels 14. Each of the first pair 16 and the second pair 18 of the wheels 14 may be aligned across the vehicle 12. A cruise control unit 20 is operationally coupled to the vehicle 12 for the conventional purpose of maintaining a speed of the vehicle 12 independent of a driver constantly depressing a pedal of the vehicle 12.

Each of a plurality of sensors 22 is coupled to the vehicle 12 adjacent to an associated one of the wheels 14 to monitor alignment or tilting of the vehicle 12 due to low pressure in one of the wheels 14. The plurality of sensors 22 comprises a first pair 24 of sensors 22 corresponding to the first pair 16 of wheels 14 and a second pair 26 of sensors 22 corresponding to the second pair 18 of wheels 14. Thus, the sensors 22 monitor alignment of the first pair 24 of sensors 22 and alignment of the second pair 26 of sensors 22. Misalignment of one of the first pair 24 of sensors 22 and the second pair 26 of sensors 22 indicates unbalanced tire pressure between the wheels 14 respectively in one of the first pair 16 of the wheels 14 and the second pair 18 of the wheels 14. Each of the first pair 24 of sensors 22 and the second pair 26 of the sensors 22 may be aligned across the width of the vehicle 12. Each of the sensors 22 is communicatively coupled to the cruise control unit 20 and the cruise control unit 20 is deactivated from maintaining a speed of the vehicle 12 upon detection of misalignment of one of the first pair 24 of sensors 22 and the second pair 26 of sensors 22. Thus, sufficiently low pressure or a flat tire will deactivate the cruise control unit 20 and the vehicle 12 will be controlled by a driver or coast to a stop without driver intervention.

Each sensor 22 comprises a panel 30. The panel 30 may have a pair of flanges 32 extending from a main section 34 of the panel 30. The flanges 32 may be diametrically aligned across the main section 34 of the panel 30 and the main section 34 of the panel 30 may be circular. Each of a pair of mounting apertures 36 extends through the panel 30 wherein the panel 30 is configured for being mounted to the vehicle 12 by conventional fasteners (not shown) extended through the mounting apertures 36 and engaging the vehicle 12. Each of the mounting apertures 36 extends through a respective one of the flanges 32. A projector 38 is coupled to the panel 20 and transmits a sensor beam 40 from the sensor 22. A receiver 42 is coupled to the panel 30 and positioned to receive the sensor beam 40 from an oppositely positioned one of the sensors 22 when the sensors 22 are aligned. A lens cover 44 may be provided and coupled to the panel 30 over the projector 38 and receiver 42. The lens cover 44 may direct the sensor beam 40 from the oppositely positioned one of the sensors 22 to the receiver 42 wherein the lens cover 42 enhances an area for receiving the sensor beam 40 defining sufficient alignment of the sensors 22 to prevent deactivation of the cruise control unit 20. Additionally, the cruise control unit 20 may be programmed to delay deactivation to allow for momentary or temporary misalignment of the sensors 22 which might occur during normal driving conditions.

In use, the sensors 22 are positioned to monitor alignment between an associated pair of the wheels 14. The associated pair of wheels 14 may be oriented across the vehicle 12 or parallel to the longitudinal axis of the vehicle 12 with substantially equal effect. Upon detection of misalignment of the sensors 22 consistent with an imbalance in tire pressures between the associated wheels 14, the cruise control unit 20 automatically deactivates to prevent the cruise control unit 20 from maintaining the speed of the vehicle 12. The cruise control unit 20 may remain deactivated until the vehicle 12 has come to a full stop, an engine of the vehicle 12 is stopped and restarted, or a similar type of action is required to prevent unintentional re-engagement of the cruise control unit 20 prior to inspection of the wheels 14 to determine that the vehicle 12 is safe to continue driving.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A tire pressure dependent cruise control device comprising:
   a vehicle;
   a pair of aligned wheels coupled to said vehicle;
   a cruise control unit operationally coupled to said vehicle for maintaining a speed of said vehicle independent of a driver constantly depressing a pedal of said vehicle; and
   a pair of sensors, each said sensor being coupled to said vehicle adjacent to an associated one of said wheels, said sensors being aligned, said sensors monitoring alignment of said sensors, said sensors being communicatively coupled to said cruise control unit wherein said cruise control unit is deactivated from maintaining a constant speed of said vehicle upon said sensors detecting misalignment of said sensors indicating unbalanced tire pressure in said wheels, said pair of sensors being aligned across a width of said vehicle.

2. The device of claim 1, further comprising:
   said pair of wheels being a first pair of wheels and said pair of sensors being a first pair of sensors;
   a second pair of aligned wheels coupled to said vehicle; and
   a second pair of said sensors, each sensor of said second pair being coupled to said vehicle adjacent to an associated one of wheels of said second pair of wheels, said second pair of sensors being aligned, said second pair of sensors monitoring alignment of said second pair of sensors, said second pair of sensors being communicatively coupled to said cruise control unit wherein said cruise control unit is deactivated from maintaining a constant speed of said vehicle upon said second pair of sensors detecting misalignment of said second pair of sensors indicating unbalanced tire pressure in said second pair of wheels.

3. The device of claim 1, wherein each said sensor comprises:
   a panel; and
   a pair of mounting apertures extending through said panel wherein said panel is configured for being mounted to said vehicle by fasteners extended through said apertures and engaging said vehicle.

4. The device of claim 1, wherein each said sensor comprises:
   a projector transmitting a sensor beam from said sensor; and
   a receiver positioned to receive said sensor beam from an oppositely positioned one of said sensors when said sensors are aligned.

5. The device of claim 1, further comprising:
   said pair of wheels being a first pair of wheels in a plurality of wheels coupled to said vehicle, said plurality of wheels comprising said first pair of said wheels and a second pair of said wheels, each of said first pair and said second pair of said wheels being aligned across said vehicle;
   said pair of sensors being a first pair of sensors in a plurality of sensors, each said sensor being coupled to said vehicle adjacent to an associated one of said wheels, said plurality of sensors comprising said first pair of sensors corresponding to said first pair of wheels and a second pair of sensors corresponding to said second pair of wheels wherein said sensors monitoring alignment of said first pair of sensors and alignment of said second pair of sensors, misalignment of one of said first pair of sensors and said second pair of sensors indicating unbalanced tire pressure respectively in one of said first pair of said wheels and said second pair of said wheels, each of said first pair of sensors and said second pair of said sensors being aligned across a width of said vehicle, each of said sensors being communicatively coupled to said cruise control unit wherein said cruise control unit is deactivated from maintaining a speed of said vehicle upon detection of misalignment of one of said first pair of sensors and said second pair of sensors; and
   wherein each said sensor comprises
      a panel, said panel comprising a pair of flanges extending from a main section of said panel, said flanges being diametrically aligned across said main section of said panel, said main section of said panel being circular,
      a pair of mounting apertures extending through said panel wherein said panel is configured for being mounted to said vehicle by fasteners extended through said apertures and engaging said vehicle, each of said mounting apertures extending through a respective one of said flanges,
      a projector transmitting a sensor beam from said sensor,
      a receiver positioned to receive said sensor beam from an oppositely positioned one of said sensors when said sensors are aligned, and
      a lens cover, said lens cover directing said sensor beam from said oppositely positioned one of said sensors to said receiver.

6. A tire pressure dependent cruise control device comprising:
   a vehicle;
   a pair of aligned wheels coupled to said vehicle;
   a cruise control unit operationally coupled to said vehicle for maintaining a speed of said vehicle independent of a driver constantly depressing a pedal of said vehicle;
   a pair of sensors, each said sensor being coupled to said vehicle adjacent to an associated one of said wheels, said sensors being aligned, said sensors monitoring alignment of said sensors, said sensors being communicatively coupled to said cruise control unit wherein said cruise control unit is deactivated from maintaining a constant speed of said vehicle upon said sensors detecting misalignment of said sensors indicating unbalanced tire pressure in said wheels, wherein each said sensor comprises a panel and a pair of mounting apertures extending through said panel wherein said panel is configured for being mounted to said vehicle by fasteners extended through said apertures and engaging said vehicle; and said panel comprising a pair of flanges extending from a main section of said panel, each of said apertures extending through a respective one of said flanges.

7. The device of claim 6, further comprising said flanges being diametrically aligned across said main section of said panel.

8. The device of claim 6, further comprising said main section of said panel being circular.

9. A tire pressure dependent cruise control device comprising:

a vehicle;
a pair of aligned wheels coupled to said vehicle;
a cruise control unit operationally coupled to said vehicle for maintaining a speed of said vehicle independent of a driver constantly depressing a pedal of said vehicle;
a pair of sensors, each said sensor being coupled to said vehicle adjacent to an associated one of said wheels, said sensors being aligned, said sensors monitoring alignment of said sensors, said sensors being communicatively coupled to said cruise control unit wherein said cruise control unit is deactivated from maintaining a constant speed of said vehicle upon said sensors detecting misalignment of said sensors indicating unbalanced tire pressure in said wheels, wherein each said sensor comprises a projector transmitting a sensor beam from said sensor and a receiver positioned to receive said sensor beam from an oppositely positioned one of said sensors when said sensors are aligned; and wherein each said sensor further comprises a lens cover, said lens cover directing said sensor beam from said oppositely positioned one of said sensors to said receiver.

* * * * *